United States Patent
Samson et al.

(10) Patent No.: US 10,830,036 B2
(45) Date of Patent: Nov. 10, 2020

(54) WELL MONITORING USING CASING CENTRALIZERS

(71) Applicant: HALLIBURTON ENERGY SERVICES, INC., Houston, TX (US)

(72) Inventors: Etienne M. Samson, Cypress, TX (US); Ahmed Elsayed Fouda, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 105 days.

(21) Appl. No.: 15/551,623

(22) PCT Filed: Mar. 31, 2015

(86) PCT No.: PCT/US2015/023709
§ 371 (c)(1),
(2) Date: Aug. 17, 2017

(87) PCT Pub. No.: WO2016/159997
PCT Pub. Date: Oct. 6, 2016

(65) Prior Publication Data
US 2018/0038222 A1 Feb. 8, 2018

(51) Int. Cl.
*E21B 17/10* (2006.01)
*G01V 3/20* (2006.01)
*E21B 47/113* (2012.01)
*E21B 47/005* (2012.01)
*E21B 43/20* (2006.01)
*E21B 33/14* (2006.01)

(52) U.S. Cl.
CPC ........ *E21B 47/113* (2020.05); *E21B 17/1014* (2013.01); *E21B 17/1078* (2013.01); *E21B 43/20* (2013.01); *E21B 47/005* (2020.05); *G01V 3/20* (2013.01); *E21B 33/14* (2013.01)

(58) Field of Classification Search
CPC ...................................... E21B 47/102
USPC ...................................... 166/242.4
See application file for complete search history.

(56) References Cited

U.S. PATENT DOCUMENTS

| | | | |
|---|---|---|---|
| 2,879,323 A | 3/1959 | Nichols et al. | |
| 4,793,409 A | 12/1988 | Bridges et al. | |
| 5,339,037 A * | 8/1994 | Bonner | G01V 3/20 324/366 |
| 5,914,603 A | 6/1999 | Daily et al. | |
| 6,188,223 B1 | 2/2001 | Van Steenwyk et al. | |
| 6,209,638 B1 * | 4/2001 | Mikolajczyk | E21B 17/1028 166/241.1 |

(Continued)

OTHER PUBLICATIONS

International Search Report and Written Opinion for PCT/US2015/023709 dated Nov. 13, 2015.

*Primary Examiner* — Taras P Bemko
(74) *Attorney, Agent, or Firm* — Thomas Rooney; C. Tumey Law Group PLLC (57) ABSTRACT

Systems and methods that relate to monitoring a subterranean formation using casing centralizers. A system for well monitoring comprising: a casing centralizer comprising arms configured to contact a wellbore when the casing centralizer is installed in a wellbore; and a receiver coupled to the casing centralizer and configured to measure an electrical magnitude of a current injected into a subterranean formation through the arms of the casing centralizer.

20 Claims, 8 Drawing Sheets

(56) References Cited

U.S. PATENT DOCUMENTS

| | | |
|---|---|---|
| 6,788,065 B1 | 9/2004 | Homan et al. |
| 7,151,377 B2 | 12/2006 | Chouzenoux et al. |
| 7,673,682 B2 | 3/2010 | Daily |
| 8,844,648 B2 * | 9/2014 | Bittar .................. E21B 47/022 175/323 |
| 9,790,787 B2 * | 10/2017 | Parker .................. G01V 5/12 |
| 2002/0166699 A1 * | 11/2002 | Evans .................. G01V 3/24 175/26 |
| 2004/0178797 A1 | 9/2004 | Rioufol et al. |
| 2004/0245991 A1 | 12/2004 | Hayman et al. |
| 2011/0308859 A1 * | 12/2011 | Bittar .................. E21B 47/022 175/45 |
| 2013/0032404 A1 | 2/2013 | Donderici et al. |
| 2014/0191761 A1 | 7/2014 | San Martin et al. |

\* cited by examiner

WELL MONITORING USING CASING CENTRALIZERS

BACKGROUND

Provided are systems and methods that relate to monitoring subterranean formations and, more particularly monitoring a subterranean formation using casing centralizers.

It can be useful to monitor a subterranean reservoir over time, in order to detect changes in the reservoir. For example, in conventional and enhanced oil recovery, processes, such as water flooding, steam flooding, and chemical flooding. It can be useful to monitor injection of water, steam, or chemicals into a formation and/or to monitor the progress of water, steam, or chemicals toward or away from one or more wellbores. Monitoring a flood front can help to avoid or detect flood breakthroughs ahead of the time, minimize water production, maximize hydrocarbon production each of which can lead to cost savings. It may be beneficial when monitoring to detect the azimuthal direction of the approaching water flood.

BRIEF DESCRIPTION OF THE DRAWINGS

These drawings illustrate certain aspects of some examples of the present invention, and should not be used to limit or define the invention.

DETAILED DESCRIPTION

Provided are systems and methods that relate to monitoring subterranean formations and, more particularly, monitoring a subterranean formation using casing centralizers. The systems and methods may include injecting current into the subterranean formation by way of the casing centralizers. Because the casing centralizers may typically be in contact with the subterranean formation, electrical contact between the casing and the formation may be ensured. An insulating (or high-resistivity) cement may be used to support and position the casing in place and in turn focus the current into the formation through the casing centralizers. Depending on the resistivity of the formation, the current may be distributed among the arms of the casing centralizer such that more current leaks from the arm with lower resistance. Receivers may be mounted in the casing centralizers, for example, to measure current leaking into the formation through each arm from which formation resistivity may be determined. In this manner, the resistivity distribution around the well may be determined. Monitoring of resistivity changes over time may enable detection of azimuthal direction of an approaching water flood, as well as monitoring of oil, gas, carbon dioxide and/or water production and/or injection.

A system for well monitoring may comprise a casing centralizer comprising arms configured to contact a wellbore when the casing centralizer is installed in a wellbore; and a receiver coupled to the casing centralizer and configured to measure an electrical magnitude of a current injected into a subterranean formation through the arms of the casing centralizer. The receiver may comprise a plurality of electrodes, wherein one or more of the plurality of electrodes is coupled to each arm of the casing centralizer. The receiver may comprise a plurality of electrodes, wherein a pair of the electrodes is mounted on at least one arm of the casing centralizer. The electrodes may comprise toroid electrodes. The receiver may comprise a plurality of electrodes, wherein at least one of the electrodes is mounted on an insulating pad and disposed in a groove of at least one arm of the casing centralizer. The receiver may comprise a plurality of electrodes configured to measure current leaking from each arm of the casing centralizer. The receiver may comprise a plurality of electrodes configured to measure potential differences between each arm of the casing centralizer and a casing string on which the casing centralizer is installed. The receiver may comprise a plurality of electrodes configured to measuring a differential current leaking from opposite sides of the casing centralizer. The system further may comprise an optical fiber, and wherein the receiver comprises a fiber optic sensor for communicating measurements of the receiver to a surface by way of the optical fiber. The receiver may comprise an electro-mechanical transducer that converts the measured electrical magnitude into a strain on a fiber optical cable. The system may further comprise a high-resistivity cement that supports and positions a casing string in a wellbore, the casing centralizer being disposed on the casing string, wherein the high-resistivity focuses current to leak into the formation through the casing centralizer in contact with the subterranean formation. The high-resistivity cement may have a resistivity of about 500 ohm meters or greater. The system may further comprise a power source connected to a casing string on which the casing centralizer is disposed, wherein the power source is configured to inject a current into the subterranean formation by way of the casing centralizer. The system may further comprise a computer system that determines a flood front location based at least partially on the measured electrical magnitude.

A method for well monitoring may comprise introducing a current into a subterranean formation by way of one or more casing centralizers in contact with the subterranean formation; and measuring electrical magnitudes of the current injected into the subterranean formation through the one or more casing centralizers. The method may comprise using a high-resistivity cement to at least partially focus the current into the subterranean formation, wherein the high-resistivity cement has a higher resistivity than the subterranean formation. The method may further comprise measuring current leaking into the subterranean formation from each arm of the one or more casing centralizers. The method may further comprise measuring potential differences between one or more arms of the one or more casing centralizers and a casing string on which the one or more casing centralizers are installed. The method may further comprise measuring a differential current leaking from opposite sides of the one or more casing centralizers. The method may further comprise determining a flood front based at least partially on the measured electrical magnitudes.

Figure 1:
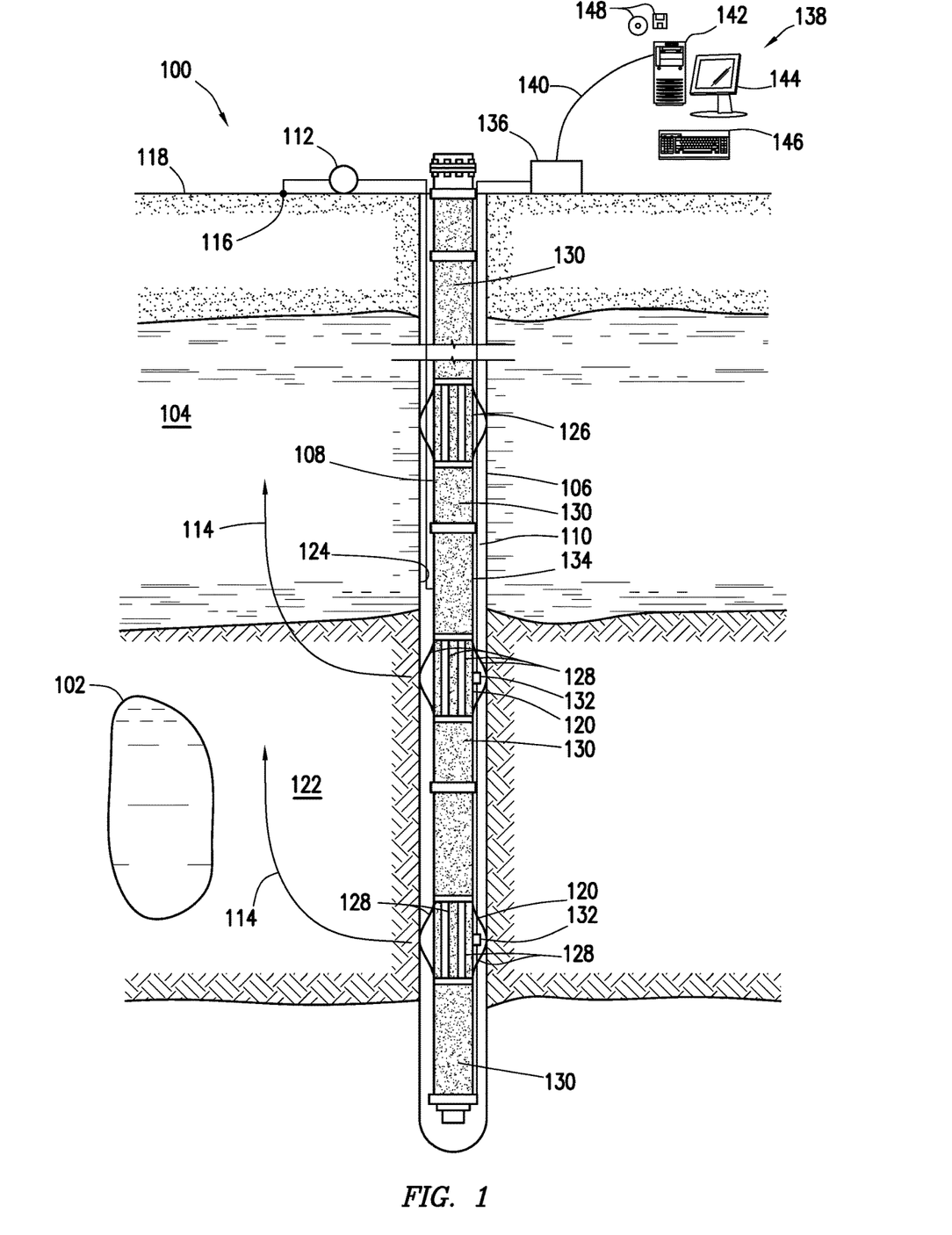
FIG. 1 is a schematic diagram of an example system for formation monitoring using casing centralizers.

FIG. 1 shows an example system 100 for use with a subterranean well. The system 100 may be used to monitor a flood front 102 as it moves through one or more subterranean formations 104. The system 100 may monitor the flood front 102 by detecting changes in the subterranean formations 104 over time. As illustrated, a wellbore 106 may extend through the subterranean formations 104. While the wellbore 106 is shown extending generally vertically into the subterranean formations 104, the principles described herein are also applicable to wellbores that extend at an angle through the subterranean formations 104, such as horizontal and slanted wellbores. For example, although FIG. 1 shows a vertical or low inclination angle well, high inclination angle or horizontal placement of the well and equipment is also possible. A casing string 108 may be disposed in the wellbore 106. Cement 110 may be used to support and position the casing string 108 in the wellbore 106.

The system 100 may comprise a power source 112 for injection of current 114 into the subterranean formations 104 through the casing string 108. The power source 112 may be coupled between the casing string 108 and a return electrode 116. The power source 112 may be coupled to the casing string 108 at any of a variety of suitable locations, for example, at the wellhead or to the casing string 108 in the well bore 106. In the wellbore 106, the power source 112 may be coupled to the casing string 108 at the zone of interest, above the zone of interest, or below the zone of interest. Multiple connections of the power source 112 to the casing string 108 may be made if needed. As illustrated, the return electrode 116 should be placed away from the casing string 108. If the return electrode 116 is placed closer, it may short circuit the current and the current available downhole for sensing is decreased. For sensing in deep wells this may become more crucial since current levels near the sensors may be much lower. In shallow wells, there is typically more freedom in placement of the return electrode 116. The decision on placement can be made by performing a simulation in the expected environment and adjusting the planned return position and repeating modeling until a signal level sufficient for sensing as well as a operationally feasible return position is obtained. As illustrated, the return electrode 116 may be placed below the surface 118. The current from the power source 112 may then flow through the casing string 108 gradually leaking out to the subterranean formations 104 as it runs along and eventually end up at the return electrode 116. The injected current may typically be a low frequency AC signal in the frequency range 0.1-100 Hz. A DC signal may also be used but with potential contact problems between electrodes, any wires connected to the electrodes and the formation.

The current 114 may be injected through the casing string 108 into the subterranean formations 104 by way of casing centralizers 120. As illustrated, the casing centralizers 120 may be positioned in a monitoring zone 122 of the subterranean formations 104. The monitoring zone 122 may be a zone or zones of the subterranean formations 104 in which monitoring may be desired, such a producing zone. The casing centralizers 120 may be placed at any desired spacing in the monitoring zone 122, depending for example on the length of the monitoring zone 122, the required vertical resolution, formation type, etc. By way of example, casing centralizers 120 may be placed in the monitoring zone 122 at a spacing of about 15 feet to about 30 feet. Any suitable design for the casing centralizers 120 may be used, including bow-spring casing centralizers and rigid blade casing centralizers. Both bow-spring and rigid-blade centralizers typically may include arms 128 that extend from the body 129 of the centralizer to contact the wellbore walls 124.

Because the casing centralizers 120 are in contact with wellbore walls 124, the casing centralizers 120 should provide electrical contact between the casing string 108 and the subterranean formations 104. Outside the monitoring zone 122, the casing centralizers 126 may be painted or otherwise coated with an electrically insulating material, such as ceramics, plastic materials, epoxy resins, glass fibers, etc., to focus the current 114 through the casing centralizers 120. Each arm 128 of the casing centralizers 120 may be considered a source electrode for flow of current 114 into the monitoring zone 122 with all of the arms 128 being excited in parallel. Depending on the resistivity of the subterranean formations 104 and, in particular, the monitoring zone 122, the current may be distributed through the arms 128 such that more current leaks from the arm 128 with the lowest resistance, i.e., that sensing a less resistive formation.

The cement 110 may be designed to enhance the monitoring capability of the system 100. For example, the cement 110 may be a high-resistivity cement that acts as an insulating coating for the entire casing string 108, restricting the current 114 to leak into the subterranean formations 104 mostly through the casing centralizers 120. As used herein, the term "high-resistivity cement" refers to cement 110 with a resistivity that is larger than 20 Ohm-meters. By way of example, the cement 110 may have a resistivity, without limitation, of about 50 ohm meters, about 100 ohm meters, about 200 ohm meters, about 300 ohm meters, about 400 ohm meters, about 500 ohm meters, or even greater. It is noted here that in order to have optimal operation a cement resistivity of 500 Ohm-meters or larger may be required. As will be appreciated by those of ordinary skill in the art, with the benefit of this disclosure, the resistivity of the cement 110 may be increased by including high-resistivity additives into the cement slurry used to form cement 110. By way of example, the high-resistivity additives may include, without limitation, ceramic powders, epoxy resins, polyester resins, or any other high-resistivity material that may be mixed with the cement slurry without undesirably impacting its functionality after setting. Alternatively or in addition to the use of high-resistivity cement, the casing string 108 or selected portions thereof may be painted or otherwise coated with an electrically insulating material 130, such as ceramics, plastic materials, epoxy resins, glass fibers, etc., to focus the current 114 through the casing centralizers 120.

The system 100 may also comprise receivers 132 for measuring an electrical magnitude representative of a characteristic of the subterranean formations 104. The electrical magnitude forming this measurement may be a current or a potential, for example. By way of example, the receivers 132 may measure the current leaking from each arm 128 of the casing centralizers 120. Alternatively, the receivers 132 may measure a parameter representative of the current leaking from each arm 128, for example, the receivers 132 may measure the potential difference between the casing string 108 (or equivalently the casing centralizer 120). These current measurements may be proportional to the current leaking into the subterranean formations 104 through each arm 128. Variations in the electrical magnitude with time may be determined. By monitoring this variation, it may be determined if properties of the subterranean formations 104, such as the monitoring zone 122, close to the receivers 132 have changed. The characteristic of the subterranean formations 104 affecting this measurement may be its resistivity, wherein its saturation with fluid close the electrodes may be concerned.

The receivers 132 may be disposed at or near the casing centralizers 120. It should be understood the present embodiment is not intended to be limited to any configuration of the receivers 132, but instead is intended to be applicable to a wide variety of configurations and designs for receivers 132. The receivers 132 may include, for example, electrodes (e.g., toroid electrodes 220 on FIG. 2, measurement electrodes 320 on FIG. 3, toroid electrodes 620 on FIG. 6, measurement electrodes 720 on FIG. 7, toroid electrodes 820 on FIG. 8, etc.), antenna, or other transducers that may be coupled to the casing centralizers 120 and also measure and transmit the electrical magnitude uphole. In some examples, the arms 128 of the casing centralizers 120 may be coated with a thin insulating layer to form capacitive electrodes that may have stable contact resistance and be less susceptible to corrosion. The receivers 132 may also comprise sensors (e.g., fiber optic sensor 214 on FIG. 2, fiber optic sensor 314 on FIG. 3, fiber optic sensor 814 on FIG. 8, etc.) for converting electrical measurements from the electrodes to optical signals. For example, receivers 132 may include one or more electro-mechanical transducers (e.g., electro-mechanical transducers 224 on FIG. 2, electro-mechanical transducers 324 on FIG. 3, etc.) that can translate the electrical measurements into an optical signal that can be detected at the surface 118. Alternatively, the receivers 132 may each comprise an electronic switching circuit that may be used to multiplex signals from different electrodes to an electric or optical fiber 134 to deliver the set of signals from different electrodes uphole.

Any suitable technique may be used for transmitting signals from the receivers 132 to the surface, including transmission of optical signals, electrical signals, etc. As illustrated, an optical fiber 134 may be disposed in wellbore 106. For example, the fiber optical cable 134 may be placed along an exterior portion of the casing string 108. It should be understood that the present embodiment is not intended to be limited to any configuration of the optical fiber 134, but instead is intended to be applicable to a wide variety of configurations and designs for the optical fiber 134. The fiber optical cable 134 may be coupled to the receivers 132. The receivers 132 may measure electrical magnitudes representative of a characteristic of the subterranean formations 104 and translate that into a phase shift of light going through the optical fiber 134.

The optical fiber 134 may be coupled to a signal generator/detector 136 at the surface 118 that can generate a signal to be transmitted downhole. By way of example, the optical fiber 134 may terminate at a surface interface with an optical port adapted for coupling fiber(s) in the optical fiber 134 to a light source and a detector in the signal generator/detector 136. The light source may transmit pulses of light along the optical fiber 134 to the receivers 132. The receivers 132 may modify the light pulses to provide measurements of the electrical magnitude, for example. The modifications may affect amplitude, phase, or frequency content of the light pulses, enabling the detector to responsively produce an electrical output signal indicative of the receiver measurements. Some systems may employ multiple fibers, in which case an additional light source and detector can be employed for each fiber, or the existing source and detector may be switched periodically between the fibers.

The signal generator/detector 136 may be coupled to a computer system 138 that may be coupled to the signal generator/detector by a control line 140. The computer system 138 may include a central processing unit 142, a monitor 144, an input device 146 (e.g., keyboard, mouse, etc.) as well as computer media 148 (e.g., optical disks, magnetic disks) that can store code representative of the above-described methods. The computer system 138 may be adapted to receive signals from the signal generator/detector 136 representative of the receiver 132 measurements. The computer system 138 may act as a data acquisition system and possibly a data processing system that analyzes the receiver 132 measurements, for example, to derive subsurface parameters and track them over time. The receiver 132 measurements received by the computer system 138 may represent resistivity in the subterranean formations 104. By way of example, the magnitude and distribution of current flows into the subterranean formations 104 from the casing centralizers 120 may vary in accordance with the source voltage and the formation resistivity. The resistivity profile in turn may be indicative of fluids in the formation pores, enabling reservoir fluids to be tracked over time. In this manner, the receiver 132 measurements may be used to monitor a proximity of the flood front 102.

Figure 2:
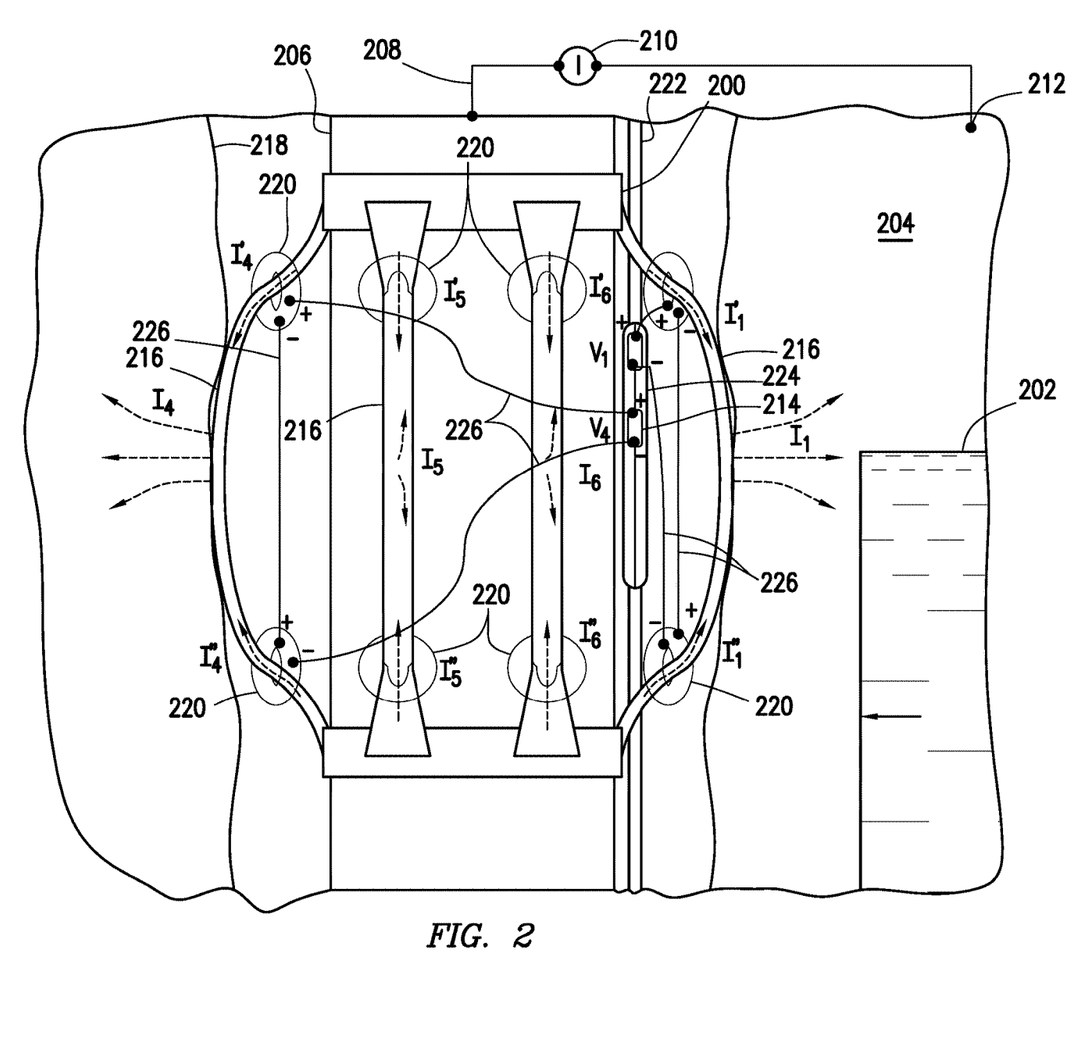
FIG. 2 is a schematic diagram showing an example system for injection of current into a formation using casing centralizers.

FIG. 2 illustrates an example of a casing centralizer 200. The casing centralizer 200 and other components shown on FIG. 2 may be used in the system 100 for monitoring a well described in connection with FIG. 1. To monitor a flood front 202 as it moves through a monitoring zone 204, current may be injected through the casing string 206 and into the monitoring zone 204 through a power cable 208. The power cable 208 may couple a power source 210 to the casing string 206 and a return electrode 212, which may be placed in the ground away from the casing string 206.

The current may be injected into the monitoring zone 204 through the casing centralizer 200 coupled to the casing string 206. Each arm 216 of the casing centralizer 200 may be in contact with the wellbore wall 218 and may be considered a source electrode for current leaking into the monitoring zone 204 from the casing string 206. Each arm 216 of the casing centralizer 200 may be excited in parallel. Depending on the resistivity of the monitoring zone 204, the current may be distributed among the arms 216 such that more current leaks from the arm 216 with the lower resistance. As illustrated on FIG. 2, the current leaking into the monitoring zone 204 from each arm 216 is represented by $I_i$, wherein i is an integer from 1 to n, wherein n is the number of arms 216 of the casing centralizer 200, which is 6 in the current example.

To make directional sensitive measurements of the monitoring zone 204, the current leaking from each arm 216 of the casing centralizer 200 may be measured by electrodes, shown on FIG. 2 as toroid electrodes 220. As illustrated, the current leaking from each arm 216 may be measured using a pair of matched toroid electrodes 220 connected in series. As illustrated on FIG. 2, current measurements for the matched pair of toroid electrodes 220 may be represented by $I_i'$ and $I_i''$, wherein i is an integer from 1 to n, wherein n is the number of arms of the casing centralizer 200, which is 6 in the current example. As will be appreciated by those of ordinary skill in the art, the current leaking from each arm 216 may be determined from these measurements as $I_i = I_i' + I_i''$. The toroid electrodes 220 may inductively convert currents into voltages across their terminals. The toroid electrodes 220 may be particularly beneficial at high frequencies (e.g., 1 KHz to 100 KHz).

As previously described, any suitable technique may be used to communicate the measured signals uphole. As illustrated on FIG. 2, an optical fiber 222 may be used to communicate the measured signals uphole. The optical fiber 222, may be disposed along the casing string 206 and may include optical fibers, optical ribbons, or other optical waveguides. Sensors, such as electro-mechanical transducers 224, may be disposed on the optical fiber 222. The electromechanical transducers 224 may be bonded to otherwise jacket the optical fiber 222. The number of the electromechanical transducers 224 may be correspond to the number of arms 216 on the casing centralizer 200 (e.g., six electro-mechanical transducers 224 in the example shown on FIG. 2). Connection wires 226 may be used to wire each of the pair of matched toroid electrodes 220 in series to a fiber optic sensor 214. The fiber optic sensor 214 may comprise electro-mechanical transducers 224 that are each coupled to a corresponding pair of the matched toroid electrodes 220. It should be understood that the connection wires 226 are shown only schematically and, in practice, any number of configurations for the connections wires 226 may be used, such as twisted pair cables to minimize crosstalk between different measurements.

The electro-mechanical transducers 224 may deform due the applied potential to induce a corresponding strain in the optical fiber 222, thus modulating light traveling through the optical fiber 222. The modulated signal may travel along the same or another waveguide to a signal interrogation system where the signal may be demodulated and the corresponding perturbation may be determined. This may obviate the need for multiplexing circuitry downhole. The strain induced in the optical fiber 222 may be proportional to the applied potential. The electro-mechanical transducers 224 and optical fiber 222 may be packaged in a single tubing encapsulated that may be clamped to the casing 206 as it is deployed. Signals from casing centralizers 200 at different axial locations along the casing 206 may be communicated over the same fiber optical cable 222. Signals from different casing centralizers 2000 may be discriminated at the surface using known fiber optic multiplexing and interrogation techniques.

The electro-mechanical transducers 224 may comprise an electro restrictive material that may be bonded to otherwise jacket the optical fiber 222. Electro restrictive materials may undergo a change in shape or dimension (e.g., elongation or contraction) in the presence of an electric field. Some widely used electro restrictive materials include piezoelectric ceramics.

Figure 3:
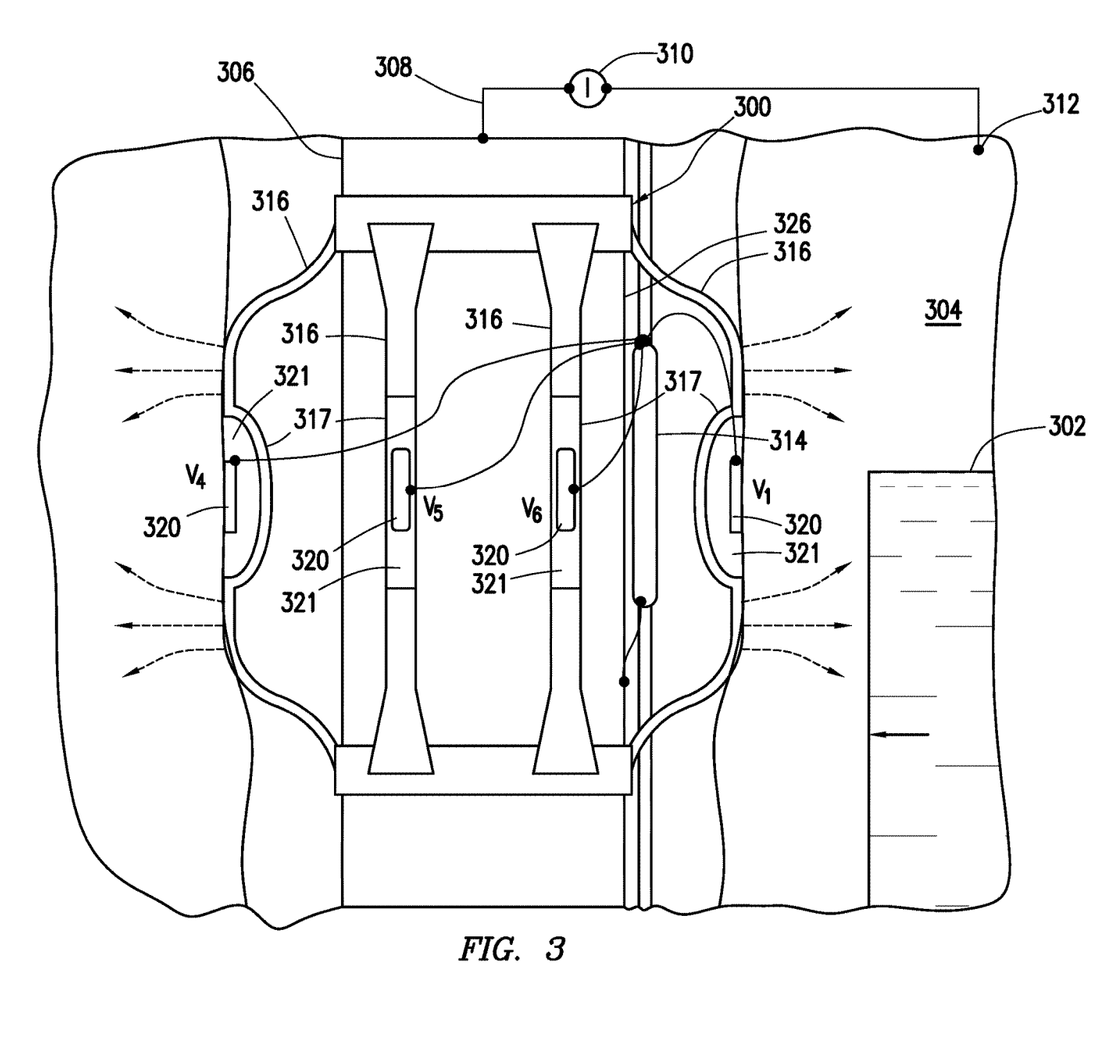
FIG. 3 is a schematic diagram showing another example system for injection of current into a formation using casing centralizers.

FIG. 3 illustrates another example of a casing centralizer 300. The casing centralizer 300 and other components shown on FIG. 3 may be used in the system 100 for monitoring a well described in connection with FIG. 1. To monitor a flood front 302 as it moves through a monitoring zone 304, current may be injected through the casing string 306 and into the monitoring zone 304 through a power cable 308. The power cable 308 may couple a power source 310 to the casing string 306 and a return electrode 312, which may be placed in the ground away from the casing string 306.

As shown on FIG. 3, dedicated measurement electrodes 320 on each ail 316 of the casing centralizer 300 may be used to make directional sensitive measurements. The measurement electrodes 320 may be insulated from the casing centralizer 300 by insulating pads 321. The insulating pads 321 may be disposed in grooves 317 in each arm 316 of the casing centralizer 300. The material for the insulating pads 321 may be polyvinyl chloride (PVC), fiber glass or other suitable material with very high electric resistivity. The measurement electrodes 320 may be coupled to the fiber optic sensor 314 by connection wires 326. The fiber optic sensor 314 may comprise electro-mechanical transducers 324, as shown on FIG. 5.

Figure 4:
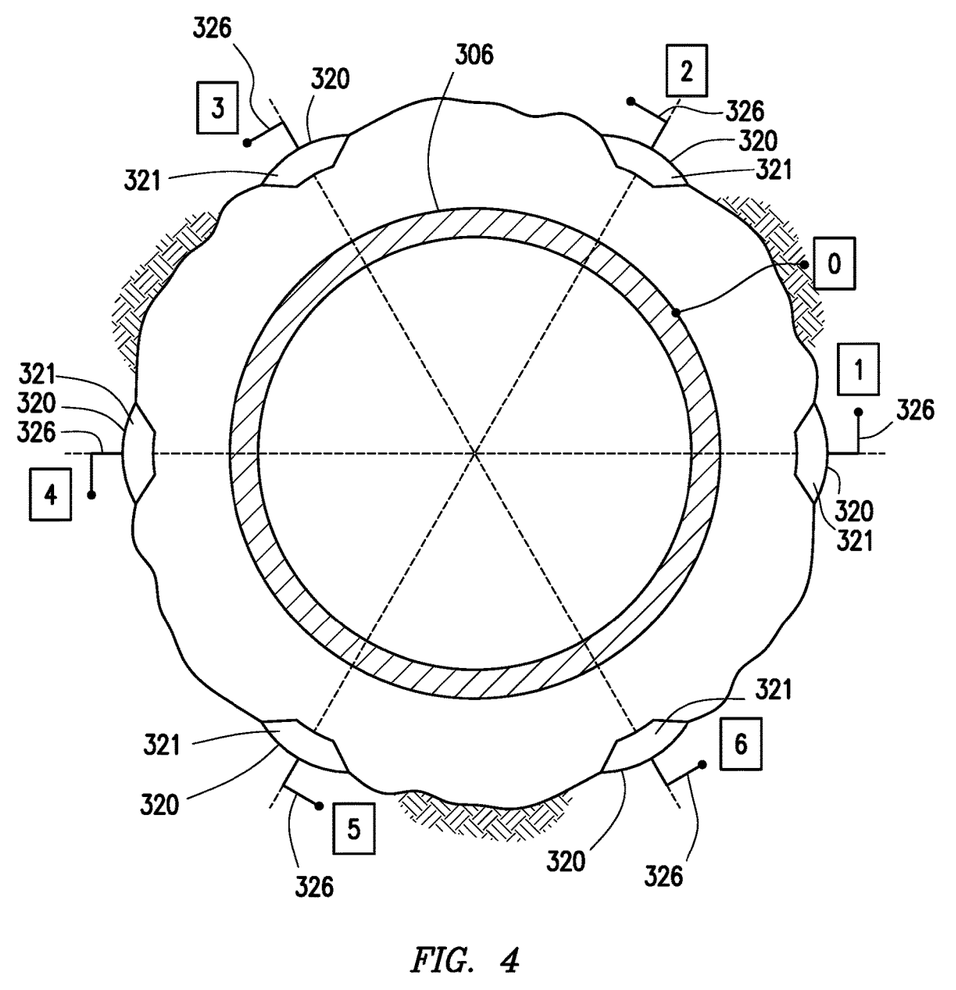
FIG. 4 is a schematic horizontal cross-section showing electrodes mounted on a casing centralizer.
Figure 5:
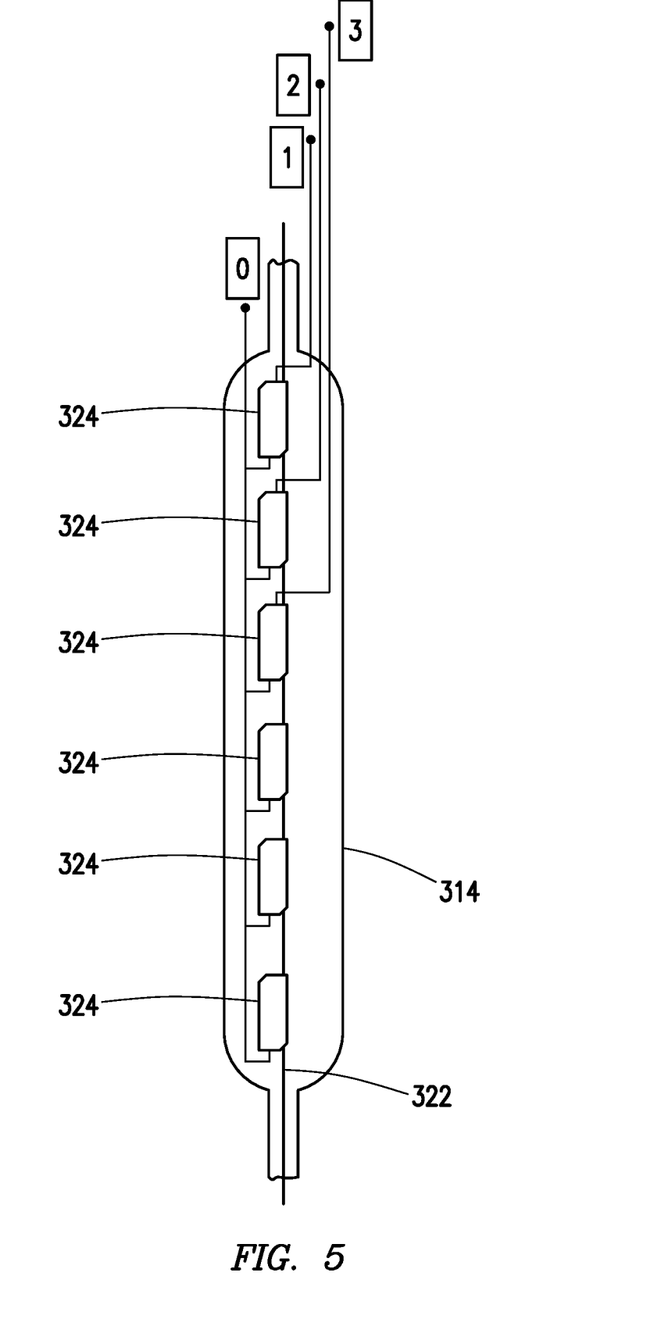
FIG. 5 is a schematic vertical cross-section of an example fiber optic sensor for use with a system for formation monitoring.

With additional reference to FIGS. 4 and 5, the potential difference between the casing string 306 (or equivalently the casing centralizers 300) and each measurement electrode 320 may be applied to the respective electro-mechanical transducer 324. FIG. 4 is a horizontal cross-section that shows six measurement electrodes 320 mounted on corresponding insulating pads 321. As illustrated, the measurement electrodes 320 may be azimuthally distributed around the casing string 306. FIG. 5 is a vertical cross-section of the fiber optic sensor 314 that shows six electro-mechanical transducers 324 bonded to the optical fiber 322. Each measurement electrode 320 may be coupled to a corresponding electro-mechanical transducer 324 (e.g., shown on FIG. 5). The fiber optic sensor 314 may also be coupled to the casing string 306. On FIGS. 4 and 5, connection points between the fiber optic sensor 314 and the measurement electrodes 320 are represented by reference numbers 1 to 6 respectively, while the connection point between the fiber optic sensor 314 and the casing string 306 is represented by the reference number 0.

These potential differences between the casing string 306 and each measurement electrode 320 may be proportional to the voltage leaking into the monitoring zone 304 from each arm 316 of the casing centralizer 300. As illustrated on FIG. 3, the voltage leaking into the monitoring zone 304 from each arm 316 may be represented by $V_i$, wherein i is an integer from 1 to n, wherein n is the number of arms 316 of the casing centralizer 300, which is 6 in the current example. Depending on the resistivity of the monitoring zone 304, the voltage $V_i$ may be distributed among the arms 316 such that more current voltage from the arm 316 with the lower resistance. The arrangement of FIG. 3 may be beneficial for use up to 100 KHz, as it does not have an inductive coupling. Lower frequencies may be used with longer transmitter-receiver spacing (for deep sensitivity) and higher frequencies may be used with shorter transmitter-receiver spacing (for shallow sensitivity).

One of ordinary skill in the art, with the benefit of this disclosure, should understand that the casing centralizer 300 of FIG. 3 may be considered the dual of the casing centralizer 200 of FIG. 2. In FIG. 2, all of the toroid electrodes 220 may have the same potential as they are all connected to the casing string 206, while currents flowing through the toroid electrodes 220 are measured. In FIG. 3, the measurement electrodes 320 may be at different potentials and this potential distribution may be measured.

Figure 6:
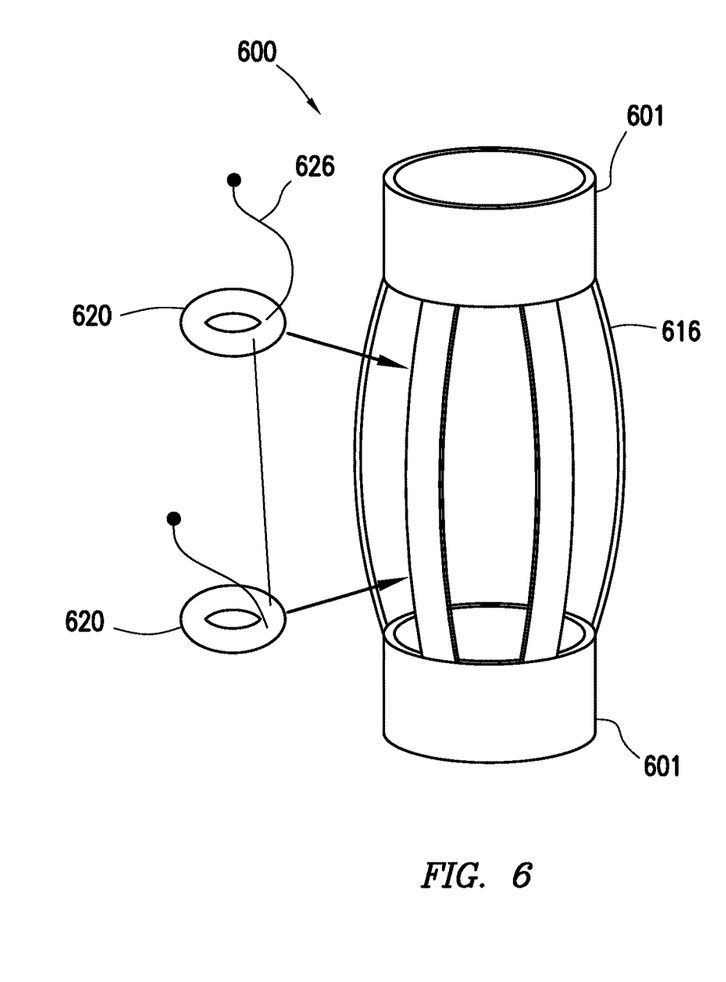
FIG. 6 is an exploded perspective view showing an example technique for attaching receivers to a casing centralizer.

FIG. 6 illustrates a casing centralizer 600. The casing centralizer 600 may be used in the system 100 for monitoring a well described in connection with FIG. 1. As illustrated, the casing centralizer 600 may comprise end portions 601, which may be ring-shaped. Arms 616 may extend between the end portions 601. As illustrated, the arms 616 may bow outward and contact the formation when disposed in a well bore. The casing centralizer 600 may commonly be referred to as a single-bow centralizer as the arms 616 each have a single outward bow. Toroid electrodes 620, which may be c-shaped may be clamped onto the arms 616 of the casing centralizer 600 as illustrated on FIG. 6. Connection lines 626 may couple the toroid electrodes to the fiber optic sensor (e.g., fiber optic sensor 214 on FIG. 2).

Figure 7:
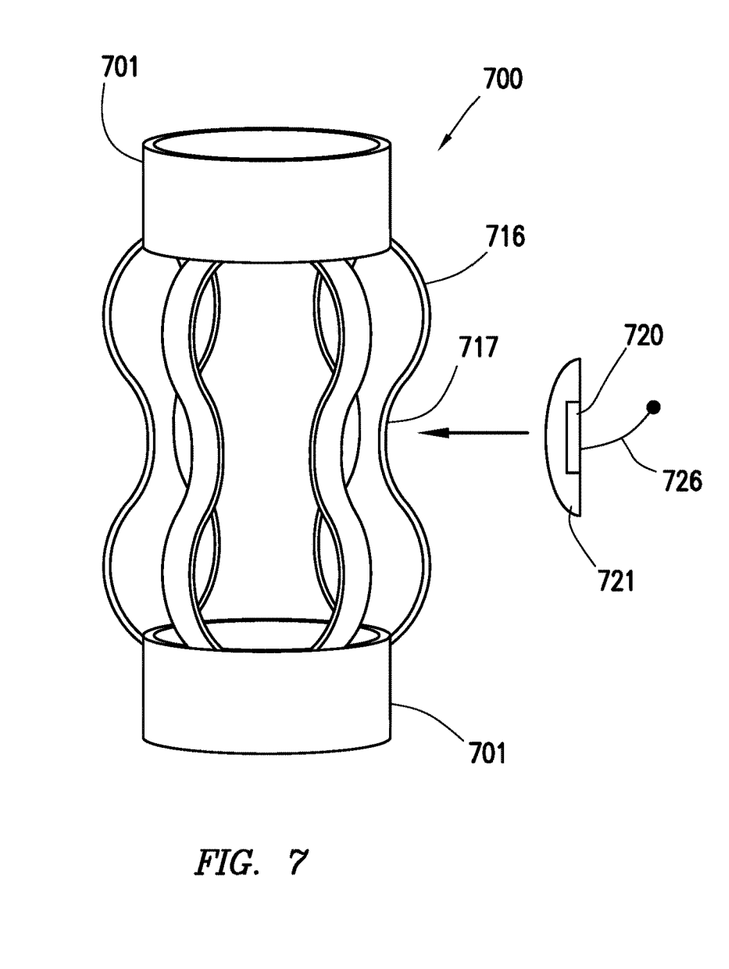
FIG. 7 is an exploded perspective view showing another example technique for attaching receivers to a casing centralizer.

FIG. 7 illustrates a casing centralizer 700. The casing centralizer 700 may be used in the system 100 for monitoring a well described in connection with FIG. 1. As illustrated, the casing centralizer 700 may comprise end portions 701, which may be ring-shaped. Arms 716 may extend between the end portions 701. As illustrated, the arms 716 may bow outward and contact the formation when disposed in a well bore. The casing centralizer 700 may commonly be referred to as a double-bow centralizer as the arms 716 each have two outward bows to form a groove 717 in each arm 716. Measurement electrodes 720 backed with insulating pads 721 may be fitted into the groove 717 of each arm 716, as illustrated on FIG. 7. Any suitable connection mechanism may be used for securing the measurement electrodes 720 to the arms 716, including fasteners, such as screws. The thickness of the pad 721 may range, for example, from about 0.05 inches to about 0.5 inches and may be optimized based on a number of factors, including the available annulus formed between the casing centralizer 700 and the well bore and the maximum available capacitive coupling (shorting) between the casing centralizer 700 and the measurement electrodes 720. The measurements electrodes 720 may range from 0.25 inches to 20 inches long (axially) and from 0.1 inches to 4 inches wide (azimuthally). For example, the measurement electrodes 720 may each be 1 inch wide and 6 inches long. It may be desired to select measurement electrodes 720 with a size as large as possible to minimize contact resistance.

Figure 8:
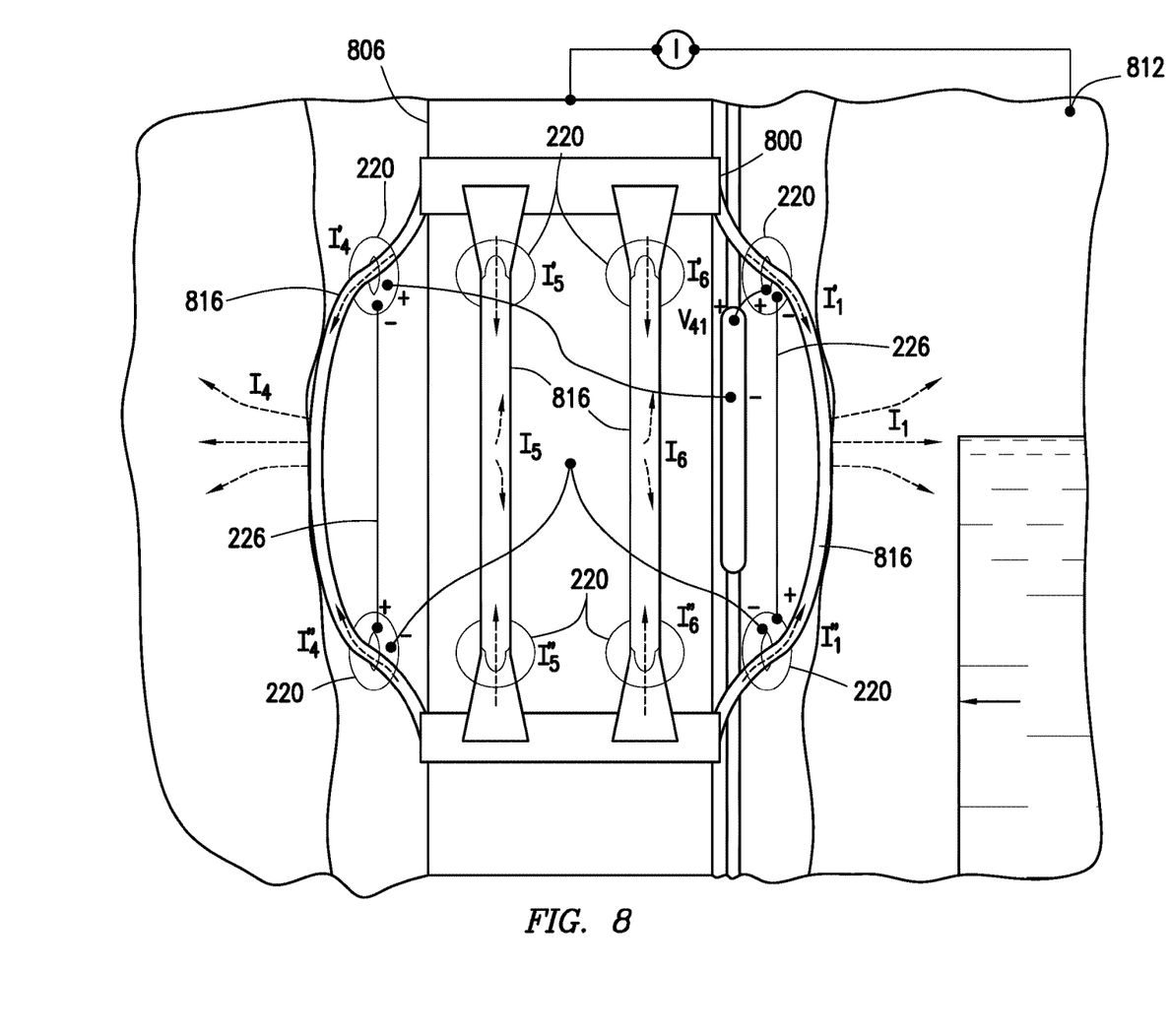
FIG. 8 is a schematic diagram showing another example system for injection of current into a formation using casing centralizers.

FIG. 8 illustrates another example of a casing centralizer 800. The casing centralizer 800 and other components shown on FIG. 8 may be used in the system 100 for monitoring a well described in connection with FIG. 1. The casing centralizer 800 is similar to the casing centralizer 200 shown on FIG. 2 except with a different wiring configuration. Rather than making absolute measurements of the current of potential (which may include the sum of direct and flood signals), FIG. 8 illustrates a techniques that takes differential measurements between arms 816 on opposite sides of the casing string 806. This may cancel out most of the direct signal and maximize azimuthal normalization. As illustrated, a pair of electrodes, shown as toroid electrodes 820, may be disposed on each arm 816. Connection wires 826 may couple the toroid electrodes 820 to the fiber optic sensor 814 and to the casing string 806 to directly measure the differential current leaking from opposite sides of the casing centralizer 800. The measured potential difference may be directly proportional to the differential current ($I_1$-$I_4$).

As previously mentioned, the signals generated downhole by the systems shown on FIGS. 1 to 7 may be analyzed at the surface 118, for example, using computer system 138, for example, as depicted on FIG. 1. Any of a variety different processing techniques may be used to determine an approaching water flood, such as flood front 102. As previously described, one technique may include measuring voltages at different azimuthal locations around a casing. The azimuthal voltages measurements may be inverted for changes in formation resistivity due to approaching water flood. The azimuthal voltage measurements may normalized in some manner to remove the unknown current from the processing workflows. One normalization method may take a baseline measurement in the absence of flood, and compute scaling weights (normalization factors) for each receiver as follows:

$$w_i = \frac{avg_i(V_i^{b1})}{V_i^{bl}}, i = 1, \ldots, N \qquad (1)$$

where $V_i^{b1}$ is the $i^{th}$ azimuthal baseline measurement, and $avg_i(V_i^{bl})$ is the average over the N azimuthal measurements. These weights may be stored and used to mathematically scale subsequent measurements. In particular, the azimuthal voltage measurements may be scaled as follows:

$$\overline{V}_i = w_i \times V_i \qquad (2)$$

where $\overline{V}_i$ is the $i^{th}$ scaled azimuthal measurement.

Continuous polar plots of the scaled measurements $\overline{V}(\phi)$ may be obtained by interpolating the discrete measurements $\overline{V}_i$. By definition, a polar plot of the scaled baseline (no flood) measurement should define a circle. A water flood approaching from a certain azimuthal direction $\phi_0$ should deform the scaled azimuthal measurements, such that $\max_\phi(\overline{V}(\phi))$ is aligned with the flood direction. At least three discrete measurements may be required to capture the orientation of the deformation caused by water flood approaching from any arbitrary direction. The deformation in the scaled azimuthal measurements, from the baseline circle, may be quantified by a geometric factor GF defined as follows:

$$GF = \frac{\max_\phi(\overline{V}(\phi)) - avg_\phi(\overline{V}(\phi))}{avg_\phi(\overline{V}(\phi))} \qquad (3)$$

As the water flood, which is typically more conductive than the reservoir fluids, approaches, the current may be redistributed such that more current is drawn towards the more conductive flood. This may yield an increase in the measured voltages at the receiver(s) aligned with the flood. The absolute value of the azimuthal voltages and the geometric factor depend on the distance to the water flood and its resistivity contrast from the formation.

However, several factors may alter the absolute value of the measured voltages, making time-lapse measurements of the absolute voltage a non-representative measure for flood. Among those factors may be fluctuations in the current, corrosion of the casing between the injection point and the receivers, and water flood breakthrough at other locations.

In contrast, time-lapse measurements of the geometric factor may provide a stable measure for flood that may insensitive to unaccounted changes that may happen outside the monitoring zone. A priori knowledge of the cement resistivity as well as reservoir and flood resistivities, from well logging and reservoir simulations, may be used to constrain the inversion of the geometric factor for the distance to flood and its shape. For differential measurements, such as the one in FIG. 8, the absolute potential of the return electrode 816 (also referred to as a reference electrode) may be mathematically added to the differential measurements to obtain the absolute voltage of each electrode (e.g., each toroid electrode 820). The absolute azimuthal voltage measurements can then be inverted for formation resistivity as described above.

There may be several potential advantages to the systems and methods disclosed herein, only some of which may be alluded to herein. One of the many potential advantages of the methods and systems may be that the azimuthal direction of an approaching water flood may be determined. They may further obviate the need for customized, prefabricated casing for current injection through the use of casing centralizing. They may further obviate the need for customized, prefabricated casing centralized by mounting of receivers on standard casing centralizers. They may further obviate the need for complex multiplexing transmitters by current injection through the casing centralizers. They may further obviate the need for active electronic components and circuits to be deployed downhole use of fiber optic methods for communication received signals uphole.

To facilitate a better understanding of the present claims, the following examples of certain aspects of the disclosure are given. In no way should the following examples be read to limit, or define, the entire scope of the claims.

EXAMPLES

Figure 9:
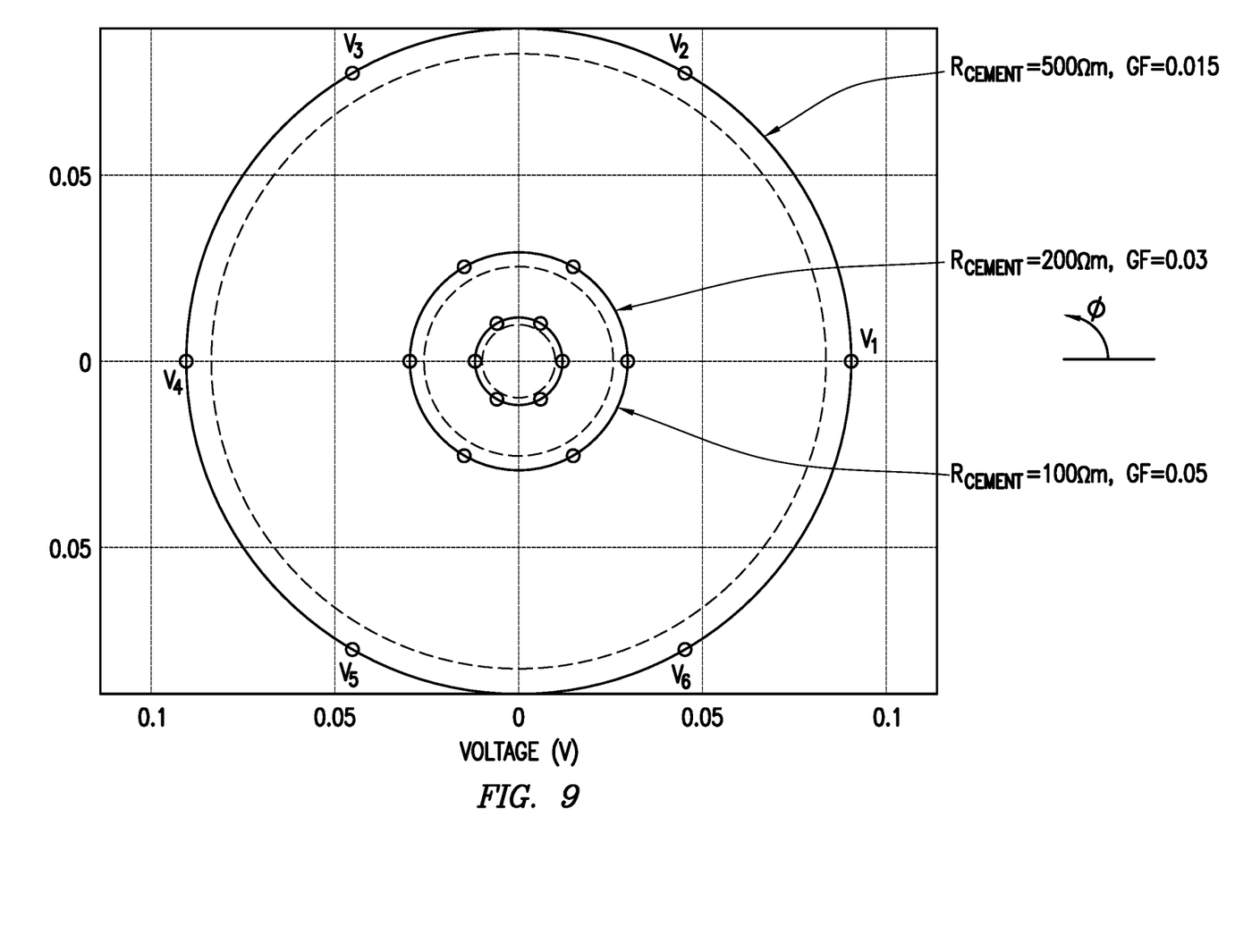
FIG. 9 is a graphical illustration showing azimuth potentials plotted to illustrate detection of a water flood by monitoring using casing centralizers.

To demonstrate the operation of the disclosed invention, a model was developed based on the example casing centralizer 300 shown on FIG. 3. In a hypothetic example, a length of 100 meters of 7 inch outside diameter casing string 306 is cemented in a wellbore having a diameter of 9 inches. The formation is assumed to have resistivity of 20 Ωm and the water flood has a resistivity of 0.2 Ωm. A current of 1 Amp is injected through a six-arm casing centralizer 300. Azimuthal potentials are plotted in FIG. 9 for a water flood at a distance of 10 feet from the casing along $\phi=0°$, and different wellbore cement resistivities. As shown in FIG. 9, current focusing enabled by higher resistivity cement boosts the measured potentials. Directional sensitivity of the measurements is evident by observing the unsymmetrical deformation of the azimuthal measurements from the baseline circle due to the presence of the water flood. The peak value of the azimuthal measurements is aligned with the direction of the water flood. It is to be noted that the geometric factor decreases with increasing the resistivity of cement. For higher cement resistivities, differential measurements may be needed to capture the small azimuthal changes caused by the water flood.

The preceding description provides various embodiments of the systems and methods of use disclosed herein which may contain different method steps and alternative combinations of components. It should be understood that, although individual embodiments may be discussed herein, the present disclosure covers all combinations of the disclosed embodiments, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A system for well monitoring comprising:
a casing centralizer comprising arms configured to contact a wellbore wall when the casing centralizer is installed in a wellbore, wherein the arms comprise source electrodes, wherein each arm is a blade, wherein each blade extends from a body of the casing centralizer, wherein a first end and a second end of each blade contact the body of the casing centralizer, wherein a portion of each blade that extends from the first end to the second end, does not contact the body of the casing centralizer; and
a receiver comprising first and second toroids that are configured to measure an electrical magnitude of a current injected into a subterranean formation through the arms of the casing centralizer, wherein the first toroid is disposed on the first end of each blade, wherein the second toroid is disposed on the second end of each blade, wherein the first and second toroids do not contact the body of the casing centralizer.

2. The system according to claim 1, wherein the first and second toroids are coupled to each arm of the casing centralizer.

3. The system according to claim 1, wherein the receiver is configured to measure current leaking from each arm of the casing centralizer.

4. The system according to claim 1, wherein the receiver is configured to measure potential differences between each arm of the casing centralizer and a casing string on which the casing centralizer is installed.

5. The system according to claim 1, wherein the receiver is configured to measure a differential current leaking from opposite sides of the casing centralizer.

6. The system according to claim 1, wherein the system further comprises an optical fiber, and wherein the receiver comprises a fiber optic sensor for communicating measurements of the receiver to a surface by way of the optical fiber.

7. The system according to claim 1, wherein the receiver comprises an electro-mechanical transducer that converts the measured electrical magnitude into a strain on a fiber optical cable.

8. The system according to claim 1, wherein the system further comprises a high-resistivity cement that supports and positions a casing string in a wellbore, the casing centralizer being disposed on the casing string, wherein the high-resistivity focuses current to leak into the formation through the casing centralizer in contact with the subterranean formation.

9. The system according to claim 8, wherein the high-resistivity cement has a resistivity of about 500 ohm meters or greater.

10. The system according to claim 1, wherein the system further comprises a power source connected to a casing string on which the casing centralizer is disposed, wherein the power source is configured to inject a current into the subterranean formation by way of the casing centralizer.

11. The system according to claim 1, wherein the system further comprises a computer system that determines a flood front location based at least partially on the measured electrical magnitude.

12. The system according to claim 1, wherein each blade includes a curved portion configured to contact the wellbore wall.

13. The method according to claim 1, wherein each blade is configured to receive current from an up-hole direction and a downhole direction.

14. A method for well monitoring comprising:
introducing a current into a subterranean formation by way of one or more casing centralizers in contact with the subterranean formation, each casing centralizer comprising arms that include source electrodes, wherein each arm is a blade, wherein each blade extends from a body of the casing centralizer, wherein a first end and a second end of each blade contact the body of the casing centralizer, wherein a portion of each blade that extends from the first end to the second end, does not contact the body of the casing centralizer, wherein a first toroid is disposed on the first end of each blade, wherein a second toroid is disposed on the second end of each blade, wherein the first and second toroids do not contact the body of the casing centralizer; and
measuring electrical magnitudes of the current injected into the subterranean formation with the first and second toroids.

15. The method according to claim 14, further comprising using a high-resistivity cement to at least partially focus the current into the subterranean formation, wherein the high-resistivity cement has a higher resistivity than the subterranean formation.

16. The method according to claim 14, further comprising measuring current leaking into the subterranean formation from each arm of the one or more casing centralizers.

17. The method according to claim 14, further comprising measuring potential differences between one or more arms of the one or more casing centralizers and a casing string on which the one or more casing centralizers are installed.

18. The method according to claim 14, further comprising measuring a differential current leaking from opposite sides of the one or more casing centralizers.

19. The method according to claim 14, further comprising determining a flood front based at least partially on the measured electrical magnitudes.

20. The method according to claim 14, wherein introducing the current into the subterranean formation by way of one or more casing centralizers in contact with the subterranean formation, comprises introducing the current through the blade from an up-hole direction and a downhole direction.

* * * * *